Dec. 31, 1957  R. J. BRITTEN  2,818,507
VELOCITY SELECTOR METHOD FOR THE SEPARATION OF ISOTOPES
Filed March 22, 1946
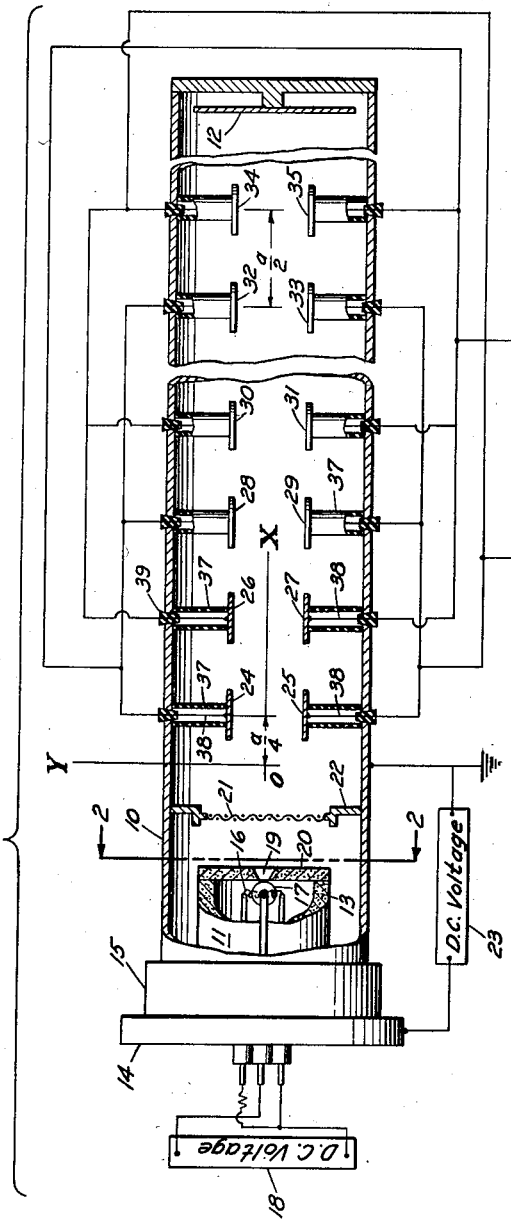
Fig.1.
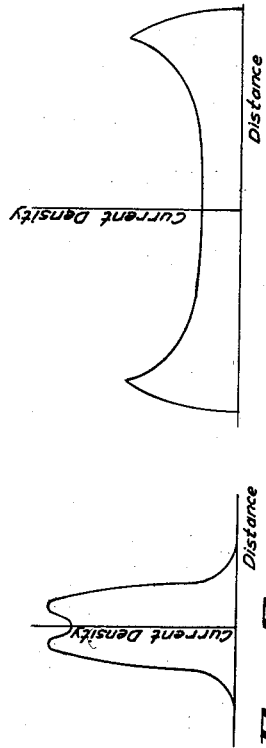
Fig.4.
Fig.3.
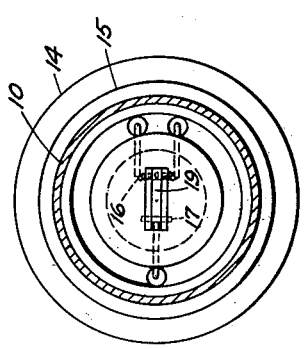
Fig.2.
Inventor
Roy J. Britten
By Robert G. Lavender
Attorney United States Patent Office 2,818,507
Patented Dec. 31, 1957

2,818,507

VELOCITY SELECTOR METHOD FOR THE SEPARATION OF ISOTOPES

Roy J. Britten, Washington, D. C., assignor to the United States of America as represented by the United States Atomic Energy Commission Application March 22, 1946, Serial No. 656,467

3 Claims. (Cl. 250—41.9)

This invention relates to a method and apparatus for separating and collecting an enriched fraction of the isotope of a particular element; or for separating and collecting one kind of atom or molecule present in a mass containing other atoms or molecules. This invention is particularly directed to the production of a concentrated or enriched fraction containing or consisting of uranium atoms of mass 235 by the treatment of natural or other uranium which contains the uranium isotope of mass 235 and also one or more other isotopes of uranium, chiefly that of mass 238.

One type of apparatus most frequently employed for accomplishing the separation of isotopes or for obtaining a fraction of an element enriched in its less abundant isotope, is the mass spectrometer, the operation of this apparatus being based upon the principle that a beam containing two or more kinds of ions with equal charge and kinetic energy but of different mass will be resolved into separate orbits according to the respective mass of the ions by a substantially uniform and constant magnetic field through which the beam is caused to pass. There are very considerable difficulties involved, however, in the use of this method, particularly that of maintaining a magnetic field of suitable strength, form and constancy. Furthermore, the degree of resolution obtainable by the mass spectrometer requires that a relatively narrow beam be utilized.

It is a principal object of this invention to overcome the above-noted difficulties of the prior methods by developing a method and apparatus for separating isotopes that dispenses with the use of a strong magnetic field of predetermined form and constancy.

Moreover, when mass spectrometer is employed to produce uranium said to be "enriched" as to the isotope 235 the content of the latter may be actually a very minor part of the whole because the resolution obtainable is not as great as desired and also because in natural uranium the 235 isotope is only about 0.71% of the element (the 238 isotope counting for about 99.28% and the 234 isotope for about 0.006%). Accordingly, it is a further object of this invention to provide a method and apparatus for separating isotopes that has high resolving power.

It is a still further object of this invention to provide a method and apparatus for separating or collecting an enriched fraction of a particular isotope of a polyisotopic substance by selectively accelerating the ionized constituents present in a beam of the polyisotopic substance that are of uniform kinetic energy, the said acceleration being applied intermittently and at spaced points along the beam and in a direction normal to the direction of propagation of said uniform energy beam whereby a transverse displacement of the isotopic constituents of different mass is obtained.

Other more specific objects of this invention will become apparent as it is described in detail in connection with the drawing accompanying this specification wherein:

Fig. 1 is a schematic illustration in cross section of a preferred embodiment of the invention;

Fig. 2 is a cross-sectional end view, the section being taken on line 2—2, of Fig. 1;

Fig. 3 is a plot of a curve representing the ion current density distribution at the collector for the uranium ion of mass 238; and Fig. 4 is a plot of a curve representing the ion current density distribution at the collector for the uranium ion of mass 235.

Referring now to the drawings, Fig. 1 is a schematic representation of the assembled mass separator and diagrammatically indicates the method of applying various potentials to the elements of the assembly in order to accomplish the isotope separation. More particularly, the apparatus illustrated in Fig. 1 comprises an elongated and highly evacuated chamber 10 supporting an ion source 11 and a collector plate 12 at its opposite ends. The ion source housing 13 is supported on the end plate 14 of the chamber 10 which end plate is insulated from the main chamber by the heavy insulating collar 15; so that the source housing may be maintained a high positive potential with respect to the remainder of the chamber. The ion source housing 13 is partially broken away in the drawings to show the electrodes 16 and 17 of the arc chamber, between which is established an arc discharge in an atmosphere of a readily vaporizable uranium compound, uranium tetrachloride for example. The electrodes illustrated comprise a filamentary electron emissive cathode 16 and a plate-like anode 17. The ions produced in the arc established between the two electrodes by the application thereto of a direct current voltage illustrated at 18, are withdrawn from the central slit-like opening in front of the end plate 20; and are accelerated in a beam (the direction of which is along the abscissa designated by the letter X in the drawing) by the difference in the potentials applied between the source screen assembly 21 and the source housing 13. The source screen 21 is shown supported in the chamber 10 by a collar 22 so as to be at the same potential as the housing. By reason of the difference in direct current potential 23 applied between the housing of the ion source 13 and the ion accelerating screen 21 the ions of like charge that are generated in the arc chamber are withdrawn through the opening 19 in the form of a beam and are given a uniform kinetic energy by falling through this fixed potential.

The accelerating electrode will therefore impart substantially equal kinetic energy to all the ions as they leave the source in the direction along the abscissa O—X. In this way there will be obtained a beam of ions constituting $U^{+235}$ and $U^{+238}$ of substantially uniform kinetic energy.

The ion beam thus produced enters the space between the first pair of plates 24 and 25 to which is applied the radio frequency alternating current voltage indicated at 36 in the drawing. There is also shown supported in the chamber 10 a plurality of similar plates 26—27, 28—29, 30—31, 32—33 and 34—35, each of the said plates being of the same dimensions and having a uniform spacing $a/2$ between their centers. The aggregate of these pairs of plates is shown supported within the chamber 10 by means of the insulating block members 37, a respective one of which is secured to each plate and to the housing so that the plates are aligned symmetrically with respect to the direction of the ion beam as it leaves the source housing 13. Each of the plates of the said respective pairs of plates is also connected to one side of the source of the radio frequency voltage 36 by the conductors 38 which are shown in the drawing as extending through the center of each insulating block 37 and through an insulating and sealing bushing supported in the housing 10 and indicated schematically in the drawing at 39.

The mode of connecting the pairs of plates as indicated by the drawings is such that the potential of each plate is 180° out of phase with the potential of a similarly positioned and directly adjacent plates; and also 180° out of phase with the plate lying diametrically opposite.

The amplitude and the frequency of the radio frequency voltage and the choice of spacing between successive pairs of plates, and the number of pairs of plates are determined by the particular separation which the apparatus is required to accomplish as will be apparent later from a consideration of an illustrated example. The ion current collector is shown supported by the end of the chamber 10 spaced from the last pair of deflector plates 34—35. The showing of the collector is schematic only, it being understood that the collector may be connected in circuit to provide a suitable deceleration of the ions prior to collection and may be modified to inhibit electron emission as the result of ion bombardment or otherwise in accordance with the teachings of the prior art.

The operation of the apparatus is described hereinafter for carrying out the separation or enrichment of the rare uranium isotope of weight 235 from the much more abundant isotope of weight 238, it being understood, however, that the invention is not so limited and may be applied equally well to the separation or enrichment of one or any number of isotopes of other elements; and also to the separation or enrichment of one kind of atom or molecule present in a mixture of other atoms or molecules of different mass.

The energy imparted to the ions by the potential difference between the ion source housing 13 and the accelerating electrode 21 and the distance $a/2$ between the mid points of the adjacent pairs of plates are so interrelated that the time necessary for the light ion to traverse the distance of $a/2$ equal to the spacing between the mid points of successive plates should be equal to one-half the period of the alternating voltage. Since the heavy ion $U^{+238}$ will have the same kinetic energy as the light ion $U^{+235}$ the former will lag behind the latter as they travel down the chamber 10; i. e., the heavy ion that enters the space between the pairs of plates at the same time as the lighter ions will emerge from the space after the aforementioned lighter ions. Therefore the number of pairs of plates can be selected so that the light ions will have traversed the entire length of the space between successive pairs of plates in the period of time required for the heavy ions starting at the same instant as the light ions to traverse the entire length of the successive pairs of plates except for the last two pairs. That is, the heavy ions will lag the light ion by a distance equal to the length of travel of the light ion in the time required for one full cycle of the radio frequency voltage 36.

The net effect of this selection of the number of pairs of plates is that the heavy ion will emerge from the space between the last pair of deflecting plates (34—35) moving substantially in the same direction that it had before it entered the space between the first pair of deflecting plates (24—25). The light ion on the contrary will emerge from the last pair of deflecting plates (34—35) with a transverse displacement in a direction ± $oy$ the magnitude and sign of which will depend upon the cycle of the alternating voltage at the instant this light ion entered the space between the first pair of plates 24—25. Thus the heavy ions will form a deposit on the central region of the collector plate 12, the width of which will be substantially equal to that of the original ion beam (neglecting the mutual repulsion between the charged particles). An idea as to the distribution of this heavy ion on the collector may be had by considering Fig. 3 which represents graphically the variations in ion current density for the $U^{238+}$ ion with the displacement from the center of the collector plate 12.

The light ion on the other hand will form a widely spread deposit on the collector plates only part of which will be superimposed upon the deposit of the heavy ions. Thus a large fraction of the deposit of the light ions will be substantially free of the heavy isotope. An idea of the distribution of the deposit of the light ion on the collector may be had by considering Fig. 4 which is a plot, derived from numerical calculation, of the ion current density distribution for the light isotope with distance from the center of the collector plate. The values for the ordinate in Figs. 3 and 4 are obviously unequal by at least a factor of 500.

In order that the above description of the operation may be more clearly understood and the invention readily practiced the following precise illustration is presented:

Assuming a value for the ion accelerating voltage 23 equal to 1000 volts and a spacing between the centers of adjacent plates ($a/2$) being set at 0.5 centimeter the velocity imparted by the accelerating electrode to a singly-charged $U^{235}$ ion, the type which it is desired to concentrate, may be obtained from the equation:

$$\frac{Mv^2}{2} = \frac{eV}{300} \qquad 1$$

wherein "$m$" is the mass of the $U^{235}$ isotope in grams, "$v$" is its velocity in centimeters per second, "$e$" is the electronic charge (e. s. u.) and "V" is the potential drop in volts. By substituting the known values of the electronic charge and the mass of the $U^{235}$ atom into the above equation and also by employing the aforementioned value of 1000 volts for the potential drop, the velocity of the $U^{235}$ ion is found to be $2.84 \times 10^6$ cm./sec. The velocity of the $U^{238}$ ion can also be derived by the above equation; or otherwise by multiplying the expression for the velocity of the $U^{235}$ ion by the square root of the ratio of the masses of the 235 to the 238 ion thus:

$$\sqrt{\frac{238}{235}} \times 2.84 \times 10^6 \text{ cm./sec.} \qquad 2$$

The presence of the square root in the above expression is due of course to the fact that two equally-charged particles of unequal mass both starting from rest and dropping through the same potential will gain velocity inversely proportionally to the square root of their respective masses.

Since it is desired that the time necessary for the light ion to traverse the distance between the centers of adjacent plates $$\left(\frac{a}{2} = 0.5 \text{ cm.}\right)$$

be equal to ½ the period of the radio frequency voltage it is apparent that the frequency of this voltage must be equal to 2.84 megacycles per second. As the ion beam enters the space between the deflecting plates traveling in a direction substantially along or parallel to the abscissa in Fig. 1, the component of the velocity it receives in the direction along the abscissa will be practically constant for any ion light or heavy as it proceeds down the tube to the collector plate since the field between pairs of plates is perpendicular to this direction. On the other hand, the ions traversing the space between a pair of deflecting plates will, depending upon the portion of the alternating current cycle when they entered the plate, experience a force along the direction of the ordinate $oy$, due to the electric field in this direction.

It was stipulated at the outset that the length of the set of deflector plates must be such that the light ion will lead the heavy ion by a distance equal to twice the space between the centers of the deflecting plates or the distance traveled by the light ion in one complete cycle of the radio frequency voltage. Accordingly, the total length of the set of deflecting plates may be determined from the equation $$\frac{a}{\alpha - 1} \qquad 3$$

wherein "$\alpha$" is the ratio of the velocity of the light ion to the velocity of the heavy ion and "$a$" is twice the distance between centers of a pair of adjacent plates. For the values stipulated above the length of the set of deflection plates is found to be equal to 158 cm. The spacing between the centers of the adjacent pairs of deflector plates was stipulated to be equal to 0.5 cm., therefore the number of pairs of plates is equal to the length of the set of deflector plates divided by the spacing between the centers of adjacent pairs of deflector plates or $$\frac{158}{0.5} = 316 \qquad 4$$

Assuming that the light ion is the ion that remains in phase with the deflecting voltage, that the peak deflection field strength $E_o$ is equal to 0.5 volt per centimeter and that the undeflected width of the beam at the collector is equal to one centimeter, the maximum spread of the ion beam for its respective isotopic constituents may be determined by considering the following equations assumed to represent instantaneous values of the field strength produced by the deflecting plate which is at right angles to the direction of travel of the ion beam:

$$E = E_o \sin (w + \phi) \sin \frac{2\pi x}{a} \qquad 5$$

wherein: $x$ is the distance of the particular point for which the field strength is being calculated, the said distance being computed from the origin $o$ in Fig. 1 which is at a distance $a/4$ from the center of the first pair of deflecting plates in the direction opposite the direction of travel of the ion beam. In the above equation, $\phi$ represents the phase of the deflecting voltage at the instant the particular ion arrives at the origin; at the time $t=0$ and at a phase angle $\phi=0$, this ion will pass the center of the first pair of deflecting plates at a maximum voltage. In the above equation $w = 2\pi f$ wherein $f$ is the frequency of the deflecting voltage.

Considering now the particular ion that remains in phase with the deflecting voltage that is the ion $U^{235+}$. The distance X traveled by the light ion, at which the field strength is to be determined by the above equation is equal to the velocity of this particular ion multiplied by the time $t$, i. e., $$X_L = vt \qquad 6$$

The frequency of the deflecting voltage is as noted above given by the equation:

$$f = v/a \qquad 7$$

and since $$w = 2v/a \qquad 8$$

therefore, $$2\pi \frac{X_L}{2} = wt \qquad 9$$

Now the acceleration for the ionized particle which remains in phase with the voltage (i. e., the uranium ion of mass 235) in the direction of the Y axis is given by the following equation:

$$d^2y/dt^2 = A(\cos \phi \sin^2 wt + \sin \phi \sin wt \cos wt) \qquad 10$$

wherein A is the maximum acceleration; which can be determined by the following equation:

$$A = \frac{E_o e}{300 M_L} \qquad 11$$

wherein $e$ is the charge of an electron ($esu$) and $M_L$ is the mass in grams of the light ion $U^{235+}$ and $E_o$ is the peak field strength in volts. Integrating this equation, and solving for the constants of integration, it is found that in the particular case requiring a large number of plates, deflection in the Y direction of the light ion at the final deflecting plate (making a few approximations), may be written as follows:

$$Y = \frac{A}{2w^2}\left\{\cos \phi \left[2\pi^2\left(\frac{X_L}{a}\right)^2 + \frac{\cos 4\pi\frac{X_L}{a} - 1}{4}\right] + \sin \phi \left[\frac{\pi x}{a} - \frac{\sin 4\pi\frac{X_L}{a}}{4}\right]\right\} \qquad 12$$

For the heavy ion $U^{238+}$ which does not remain in phase with the deflecting voltage the distance X from the origin that this ion has traveled in the same time interval $t$ may be given in the following equation:

$$X_H = \alpha vt \qquad 13$$

wherein $v$ is the velocity of the heavy ion $U^{238+}$. The field that exists at right angles to the beam at particular point $X_H$ along the path of travel is determined by the following equation:

$$E = E_o \sin (wt + \phi) \sin \alpha wt \qquad 14$$

and the acceleration of this heavy particle in the direction transverse to the direction of propagation, i. e., the Y direction, may be determined by the following equation:

$$d^2y/dt^2 = B(\cos \phi \sin wt \sin \alpha wt + \sin \phi \cos wt \sin \alpha wt) \qquad 15$$

Integrating, solving for the constants of integration and making an approximation, the equation may be reduced to the following:

$$y_H = \frac{B}{2w^2(\alpha-1)^2}\left\{\cos \phi \left(1 - \cos\left[(\alpha-1)2\pi X_H\right]\right) - \sin \phi \sin (\alpha-1)\frac{2\pi X_H}{a} - \sin \phi \cdot \frac{\alpha-1}{\alpha+1}\alpha\frac{4\pi X_H}{a}\right\} \qquad 16$$

At the final deflecting plate which is at a distance $X_f$ from the origin O equal to $$\frac{a}{\alpha - 1}$$

the deflection in the Y direction given the heavy ion $U^{238+}$ may be computed by the following equation:

$$y_f = \frac{B}{2w^2(\alpha-1)^2} \cdot \frac{4\pi\alpha \sin \phi}{\alpha+1} \qquad 17$$

In the above equations B is equal to the maximum acceleration given the heavy ion, and may be found by multiplying A by the ratio of the masses thus $$B = A\frac{M_L}{M_H} \qquad 18$$

At the same position at the distance $X_f$ from the origin, the deflection of the light ion in the Y direction may be computed from the following equation:

$$y_f = \frac{A}{2w^2(\alpha-1)^2}\left(2\pi^2 \cos \phi + \pi(\alpha-1) \sin \phi\right) \qquad 19$$

For the particular data assumed above the deflection of the heavy ion is found to be equal to $.503 \sin \phi$ and the deflection of the lighter ion at the distnce $X_f$ from the origin (for the data assumed above) is equal to $1.59 \cos \phi$.

Since it is proposed in a specific embodiment of this invention to place the collector at a distance from the last pair of plates equal to the total length of the pair of plates the slope or angle of the heavy and light ion leaving the last pair of plates should also be determined. This may be done by taking the first derivation with respect to the distance X along the abscissa of the above equations for the displacement, thus:

$$dy/dx \text{ (Heavy)} = \frac{B}{2w^2(\alpha-1)^2} \cdot \frac{2\pi}{a} \frac{(\alpha-1)^2}{(\alpha+1)^2} \sin \phi \quad 20$$

$$dy/dx \text{ (Light)} = \frac{A}{2w^2(\alpha-1)^2}\left(\frac{4\pi^2(\alpha-1)}{a} \cos \phi + \frac{\pi(\alpha-1)^2 \sin \phi}{a}\right) \quad 21$$

and in the specific case $$X = X_f$$

$$dy/dx \text{ (Heavy)} = .000126 \sin \phi \quad 22$$

$$dy/dx \text{ (Light)} = 0.020 \cos \phi \quad 23$$

Utilizing the above equations, calculations show that the maximum spread of the heavy ion is $\pm 1.01$ cm., the maximum spread of the light ion is $\pm 5.3$ cm., and that more than 50% of the light ions strike the collector plate at a distance plus or minus 3.0 cm. either side of its center. It is apparent that with this high degree of resolution one can obtain a practically pure concentration of the $U^{235}$ isotope.

It might be more practical, however, to utilize a smaller deflection or a more diffuse beam and not attempt to obtain the nearly pure light isotope in the first stage. Accordingly, there is set forth below another specific example of a separator as follows:

| | |
|---|---|
| Number of deflector plates | 316 |
| Ion accelerating voltage | 20,000 volts |
| Frequency of deflecting field | 2.84 megacycles. |
| Plate spacing (along the beam) $(a/2)$ | =2.23 cm. |
| Length of set plates $a/\alpha-1$ | 707 cm. |
| Distance from the end of deflector set to the collector | 300 cm. |
| Peak deflecting field | 5 volts per cm. |
| Undeflected width of beam in the $y$ direction at collector | 20 cm. |
| Maximum spread of heavy ions | plus or minus 15 cm. |
| Maximum spread of light ions | plus or minus 40 cm. |

More than 50% of the light ions fall outside of $\pm 20$ cm.

If vapors other than pure uranium (uranium tetrachloride for example) are utilized to sustain the arc in the ion source, ions other than those dealt with in the above mathematics will be produced. For example, combined ions of uranium tetrachloride may be produced, and would have a mass to charge ratio different by the mass of the light chlorine atom of the compound. Accordingly, these ions will lag behind, the light 235+ ion say by N cycles. During the part of the travel of this combined ion in which the lag is building up to an even number of cycles, it will get no resultant displacement as deviation in direction. (It should be clear from the foregoing that the heavy (238) ion although it receives no deviation in direction may be displaced in the beam, an amount depending upon the phase of the A. C. when it enters the first pair of deflecting plates.) During any odd cycle that is left over the combined ion may get a displacement in the $y$ direction which is equal to 1/N times the displacement of the 238+ ion. During any portion of a cycle that is left over the combined ion ($U^{238}Cl^{35+}$) may get a deviation in direction which is a small percentage of the deviation of the 235+ ion. In the case of the ($U^{238}Cl^{35+}$) ion of mass 273, the total lag will be 12.3 cycles behind the 235+ ion. The deviation in direction will be less than 1/40 of that of the 235+ ion. Thus, it will be apparent that other types of ions only add to the current in the main undeflected beam and therefore, may increase the number of scattered ions and the space charge effects, but do not otherwise interfere.

With respect to the deviation and lateral translation or displacement of the ions it might be noted that the ion of the isotope getting the greater deviation (235+ in the case assumed) receives its maximum deviation if it arrives at the midpoint of the first deflector plates in phase with the maximum of the applied voltage. The ion of the isotope which is little deviated (238) gets its greatest lateral translation or displacement when it arrives at the first deflector plate when the voltage is zero. It is apparent then, that at some instant the distance between the two isotopic ion beams at the collector is greater than the average distance. Accordingly, it might be desirable to make use of this phenomenon by adding an additional set of plates with its proper phase and magnitude of the applied voltage, it may be desirable also to use a fraction of the number of deflector plates originally described with this later deflector.

It may be noted that near the deflecting plates there is an alternating component of the field parallel to the direction of travel of the ion beam. If this component is large enough to be important its effect will be to bunch the ions so that they come more into phase with the maximum deflecting voltage.

The above specific examples of this invention have been set forth with the understanding that numerous modifications in the construction and arrangement of parts may be made. For example, the deflecting plates utilized to establish an electric field normal to the direction of propagation of the ion beam may simply comprise a pair of parallel wires, spaced apart and set at right angles to the direction of the beam. Moreover, the invention is not limited to the utilization of periodic electric field means for effecting the desired separation of the isotopic constituents of the beam, since there are other means known to deflect moving charge particles, i. e., a magnetic field. One method of utilizing a magnetic rather than an electric field to produce the desired deflection of an ion of a particular mass to charge ratio in the beam would be to utilize a plurality of tank coils of an R. F. oscillator and to space these tank coils along the beam to set up timed and spaced magnetic fields in a direction transverse to the direction of propagation of the beam. The frequency spacing and phase relation of these magnetic fields could be set to deflect an ion of predetermined velocity and to produce no appreciable resultant deflection on ions of other velocities. It is clear therefore in view of the foregoing that many variations may be made in the particular structure disclosed without departing from the scope of this invention as set forth in the appended set of claims.

The present apparatus can be used without change for the separation of isotopes of elements other than uranium.

I claim:

1. An apparatus for separating ions in accordance with their mass to charge ratio comprising in combination an elongated evacuated chamber, means for propagating a beam of said ions at uniform kinetic energy through said chamber in the direction of its elongation whereby similarly charged ions will have a velocity inversely proportional to the square root of their respective masses, a plurality of pairs of deflecting plates positioned longitudinally at spaced points along said beam for subjecting said beam of ions to a series of spaced consecutive alternating electric fields having a component transverse to the direction of propagation of said beam, a source of high frequency alternating current, successive pairs of said plates being connected to said source simultaneously in opposite phase to each other, whereby a particular ion of predetermined mass to charge ratio will be deflected in consecutive opposite directions at each of the alternating fields of said series, the number of said separate fields of said series being equal to $2/\alpha-1$ wherein $\alpha$ is the ratio of the velocity of the ion of predetermined mass to charge ratio to the velocity of another ion constituent of said beam having a greater mass to charge ratio, and a single collector means for simultaneously collecting the separated ions, said means consisting of a collector plate within and adjacent one end of the elongated evacuated chamber, said collector being arranged transversely of the beam at a point rectilinearly spaced from the final pair of deflecting plates in the direction of the beam, said collector plate providing separate zones for simultaneously collecting both the deflected and undeflected ions.

2. An apparatus for separating or collecting an enriched fraction of a particular isotope of a polyisotopic substance from its other isotopic constituent comprising an evacuated chamber containing means for ionizing a vapor of said polyisotopic substance, means for applying a predetermined accelerating potential to said ions of like charge whereby to form a longitudinal beam of ions having uniform kinetic energy, a plurality of pairs of deflecting plates positioned longitudinally at spaced points along said beam, means for applying an alternating voltage to each of said pair of plates so that the polarity of the plates positioned longitudinally and diametrically adjacent a particular plate will be 180° out of phase with the potential of the said particular plate, and means for simultaneously collecting the separated ions comprising a collector plate within and adjacent one end of the evacuated chamber, said collector plate being arranged transversely of the beam at a point rectilinearly spaced from the final pair of deflecting plates in the direction of the beam, said collector plate providing separate zones for simultaneously collecting both the deflected and the undeflected ions.

3. An apparatus for separating or collecting an enriched fraction of a particular isotope of a polyisotopic substance from its other isotopic constituents comprising in combination an elongated evacuated chamber supporting at one end thereof, means for producing gaseous ions of said polyisotopic substance, means for imparting a uniform kinetic energy to said ions to propagate said ions in the form of a beam throughout said chamber in the direction of the elongation whereby said ions of like charge will acquire velocities inversely proportional to the square root of their respective masses, a plurality of pairs of deflecting plates positioned longitudinally at spaced points along said beam for impressing at points spaced along the path of said beam an alternating electric field having a component transverse to the direction of propagation of said beam to cause the ions to be deflected transversely of said beam, a source of high frequency alternating current, successive pairs of said plates being connected to said source simultaneously in opposite phase to each other, the number of said spaced points being equal to $2/\alpha - 1$ wherein $\alpha$ is the square root of the ratio of the mass of the heavy isotope to the mass of the light isotope, whereby the ion of the heavy isotope will emerge substantially undeflected in traversing the distance along which said fields are impressed, means for simultaneously collecting the separated ions comprising a collector plate within and adjacent one end of the evacuated chamber, said collector plate being arranged transversely of the beam at a point rectilinearly spaced from the final pair of deflecting plates in the direction of the beam, said collector plate providing separate zones for simultaneously collecting both the deflected and the undeflected ions.

References Cited in the file of this patent

UNITED STATES PATENTS 2,387,550　　Winkler _____ Oct. 23, 1945

OTHER REFERENCES

"A New Mass Spectrometer" by Smythe et al., Physical Review, volume 40, May 1, 1932, pages 429–433.